No. 807,840. PATENTED DEC. 19, 1905.
A. E. MARTIN & R. W. KENNARD.
HOLDER.
APPLICATION FILED MAR. 2, 1905.
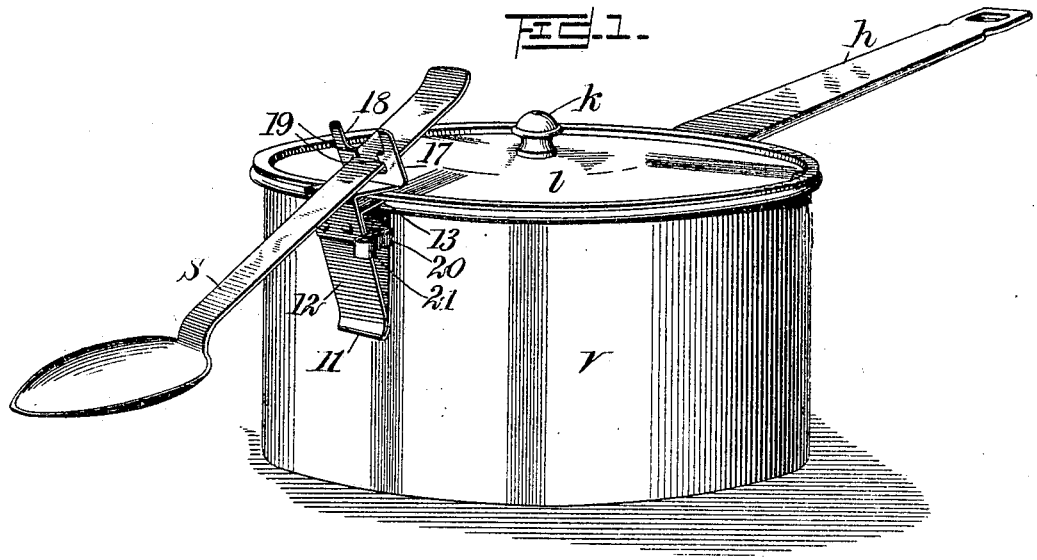
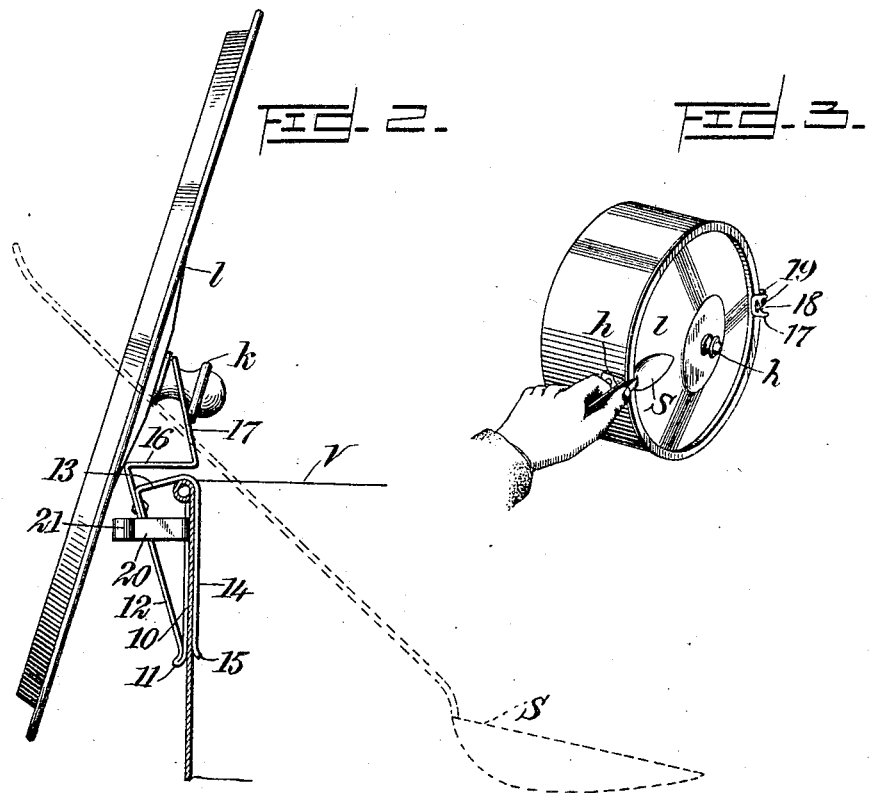
WITNESSES:
INVENTORS
Alonso E. Martin
Roy W. Kennard
BY
ATTORNEYS

UNITED STATES PATENT OFFICE.

ALONSO E. MARTIN, OF TOLEDO, AND ROY W. KENNARD, OF FERNHILL, WASHINGTON.

HOLDER.

No. 807,840.      Specification of Letters Patent.      Patented Dec. 19, 1905.

Application filed March 2, 1905. Serial No. 248,024.

*To all whom it may concern:*

Be it known that we, ALONSO E. MARTIN, a resident of Toledo, in the county of Lewis, and ROY W. KENNARD, a resident of Fernhill, in the county of Pierce, State of Washington, citizens of the United States, have invented a new and Improved Holder, of which the following is a full, clear, and exact description.

Our invention relates to holding devices, and more particularly to those adapted for culinary use to support upon a kettle or other vessel its lid and a spoon or the like.

It has for its principal objects the provision of a simple, strong, and efficient holder.

Reference is to be had to the accompanying drawings, forming a part of this specification, in which similar characters of reference indicate corresponding parts in all the views.

Figure 1 is a perspective view of a saucepan to which is applied one embodiment of our invention with a spoon carried thereby. Fig. 2 is a side elevation of the holder, the wall of the pan being shown in section with its lid supported upon the holder and a spoon indicated in dotted lines; and Fig. 3 illustrates in perspective the use of the holder in retaining the lid upon the pan while draining the contents.

10 designates a clip member which is bent outwardly at 11 and then back upon itself for a short distance to furnish a curved lip, then outwardly at a somewhat acute angle to form a carrier-arm 12. To the arm, near the upper end of the member 10, is secured a second clip member, extending over its companion at 13 and then downwardly parallel to it at 14, it being finally curved at 15 to furnish a corresponding lip, these diverging portions insuring the ready introduction of the side of a vessel into the open mouth between the clip members. Above the securing-point of the member 14 the carrier-arm is bent so that it lies substantially at right angles to the clip at 16 and extends over it. It is then bent upwardly and outwardly to furnish an engaging portion 17. In this, at its outer extremity, is a recess 18, opening through the top of the arm and having between this opening and its bottom portion opposite projections 19 19, dividing the recess into two connected portions. From one side of the clip member 10 extends an arm or finger-piece 20, which may lie in close proximity to the adjacent side of the carrier-arm and have outside said arm an enlarged or rounded grip portion 21.

In applying the device to a vessel V it may be grasped by the finger-piece, and by then pressing upon the carrier-arm the clip members will be separated, allowing the clip to be set astride of the vessel-wall, and as the device is preferably made of spring sheet metal, its resiliency will cause the clip members to firmly grasp the vessel. In this position the lid $l$ of the vessel may be supported upon the holder by inserting its knob $k$, which is grooved in the usual manner, in the outer portion of the recess 18, resting upon the projections 19 and retained against outward movement by the contact of the upper end of the knob with the projections and recess-walls. Instead of the lid a spoon S may be inserted in the holder and held either in the position illustrated in Fig. 1, with its bowl outside the vessel, as would be desirable if the lid were in place, or within the vessel, as is shown in Fig. 2. In either case the space between the adjacent ends of the projections is sufficient to permit the introduction of the narrow portion of the spoon-handle, while the usual increase in the width of the handle prevents its longitudinal displacement. When in the first-named position, the spoon may rest upon the carrier-arm at the juncture of the portions 12 and 16. This also receives the weight of the cover when it is placed upon the holder. It will be noted that the portion 16 of the carrier-arm when the holder is in place upon the vessel extends over its rim, so that the edge of the lid lies beneath it. The holder when attached to the vessel at the opposite side from its handle $h$ acts to retain this portion of the lid and enables the user to apply some such utensil as a spoon to the side adjacent to the handle and, grasping it as is illustrated in Fig. 3, so fix the lid that the vessel may be inverted to drain the contents. The removal of the device from the vessel may be effected by grasping the finger-piece and pressing in the carrier-arm to loosen the clip, this being a substantial reversal of the steps for its application.

Having thus described our invention, we claim as new and desire to secure by Letters Patent—

1. A holder comprising a clip adapted to engage a vessel, a carrier-arm extending outwardly from the clip and then inwardly, engaging means rising from the inner extremity of the arm, and a finger-piece extending from the clip adjacent to the carrier-arm.

2. A holder comprising a clip member projecting upwardly and outwardly to furnish a carrier-arm, a second clip member extending from the carrier-arm, and a finger-piece carried by the first-named clip member and extending adjacent to the carrier-arm.

In testimony whereof we have signed our names to this specification in the presence of two subscribing witnesses.

ALONSO E. MARTIN.
ROY W. KENNARD.

Witnesses:
GUY W. KENNARD,
DUDLEY ESHELMAN.